US011926306B2

(12) United States Patent
Foerch et al.

(10) Patent No.: US 11,926,306 B2
(45) Date of Patent: Mar. 12, 2024

(54) ELECTRONICALLY SLIP-CONTROLLABLE POWER BRAKING SYSTEM

(71) Applicant: Robert Bosch GmbH, Stuttgart (DE)

(72) Inventors: Dirk Foerch, Neuenstadt/Stein (DE); Verena Barske, Untergruppenbach (DE); Andreas Krautter, Steinheim (DE); Michael Bunk, Leingarten (DE); Peter Ziegler, Grossbottwar (DE); Ulrike Schaefer, Grossbottwar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 405 days.

(21) Appl. No.: 17/428,374

(22) PCT Filed: Dec. 7, 2019

(86) PCT No.: PCT/EP2019/084103
§ 371 (c)(1),
(2) Date: Aug. 4, 2021

(87) PCT Pub. No.: WO2020/164775
PCT Pub. Date: Aug. 20, 2020

(65) Prior Publication Data
US 2022/0153247 A1    May 19, 2022

(30) Foreign Application Priority Data
Feb. 14, 2019    (DE) .......................... 102019201907.2

(51) Int. Cl.
*B60T 13/74*    (2006.01)
*B60T 8/94*    (2006.01)
(Continued)

(52) U.S. Cl.
CPC .............. *B60T 8/94* (2013.01); *B60T 13/686* (2013.01); *B60T 13/745* (2013.01);
(Continued)

(58) Field of Classification Search
CPC .... B60T 13/745; B60T 13/686; B60T 17/225; B60T 2270/403; B60T 2270/404; B60T 2270/406; B60T 8/94; B60T 2270/10
See application file for complete search history.

(56) References Cited

U.S. PATENT DOCUMENTS

2002/0050739 A1* 5/2002 Koepff ................... B60T 8/348
                                                     303/122.09
2011/0175436 A1* 7/2011 Nakata ................. B60T 8/4081
                                                       303/6.01
(Continued)

FOREIGN PATENT DOCUMENTS

CN    103723139 A    4/2014
CN    107618482 A    1/2018
(Continued)

OTHER PUBLICATIONS

International Search Report for PCT/EP2019/084103 dated Feb. 17, 2020.

*Primary Examiner* — Bradley T King
(74) *Attorney, Agent, or Firm* — NORTON ROSE FULBRIGHT US LLP; Gerard A. Messina

(57) ABSTRACT

An electronically slip-controllable power braking system for a motor vehicle, in which a controllably drivable pressure generator supplies multiple brake circuits connected in parallel to one another with pressure medium under brake pressure. Each of the brake circuits are separable through existing first control valves from the pressure generator and include second control valves that are connected downstream from the first control valves to control the brake pressure in the wheel brakes, which are connected with the brake circuits. An electronic control unit in the brake circuits has three devices, the third device puts the first control valve of a brake circuit into a passage position if a leakage is established downstream from the second control valve in
(Continued)

this brake circuit and if it is established that the pressure generated by the pressure generator has at least approximately reached or exceeded a pressure limit of the first control valve.

5 Claims, 3 Drawing Sheets

(51) Int. Cl.
  *B60T 13/68* (2006.01)
  *B60T 17/22* (2006.01)
(52) U.S. Cl.
  CPC ......... *B60T 17/221* (2013.01); *B60T 2270/10* (2013.01); *B60T 2270/402* (2013.01); *B60T 2270/406* (2013.01)

(56) References Cited

U.S. PATENT DOCUMENTS

| | | | | |
|---|---|---|---|---|
| 2015/0314767 | A1* | 11/2015 | Miyazaki | B60T 13/662 303/10 |
| 2016/0152223 | A1* | 6/2016 | Bauer | B60T 7/042 303/14 |
| 2017/0015290 | A1* | 1/2017 | Oosawa | B60T 13/146 |
| 2018/0297574 | A1 | 10/2018 | Zimmermann et al. | |
| 2019/0031165 | A1* | 1/2019 | Besier | B60T 8/348 |
| 2019/0184958 | A1* | 6/2019 | Watanabe | B60T 8/48 |
| 2020/0039495 | A1* | 2/2020 | Henning | B60T 13/167 |
| 2020/0276963 | A1* | 9/2020 | Zimmermann | B60T 13/686 |
| 2020/0307536 | A1* | 10/2020 | Biller | B60T 13/686 |
| 2021/0053540 | A1* | 2/2021 | Besier | B60T 13/58 |
| 2021/0339726 | A1* | 11/2021 | Kim | B60T 7/042 |
| 2022/0185254 | A1* | 6/2022 | Nakayasu | B60T 13/686 |

FOREIGN PATENT DOCUMENTS

| | | |
|---|---|---|
| DE | 69205292 T2 | 3/1996 |
| DE | 102012002791 A1 | 8/2013 |
| DE | 102015219905 A1 | 4/2017 |
| DE | 102015225057 A1 | 6/2017 |
| DE | 102016202224 A1 | 8/2017 |
| DE | 102018212016 A1 | 1/2020 |
| JP | 2001206209 A | 7/2001 |
| WO | 2015032637 A1 | 3/2015 |

* cited by examiner

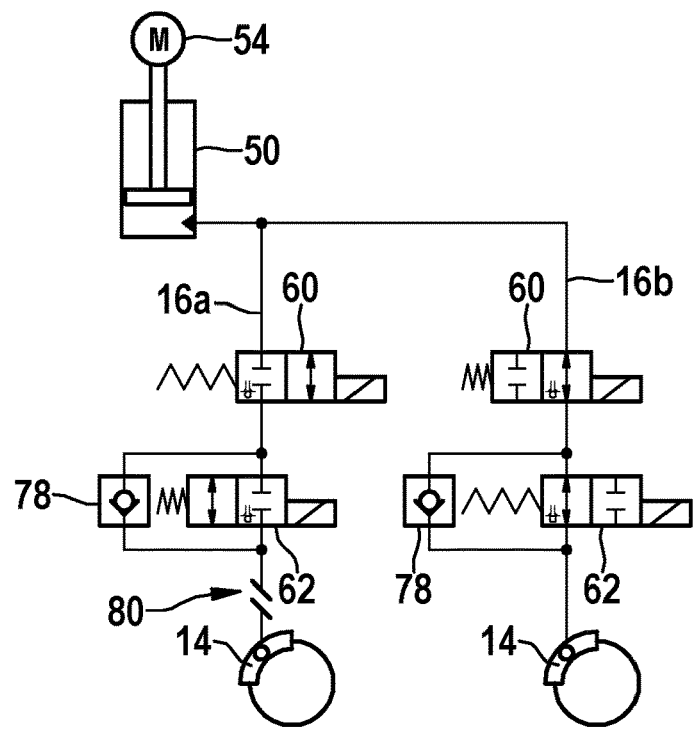
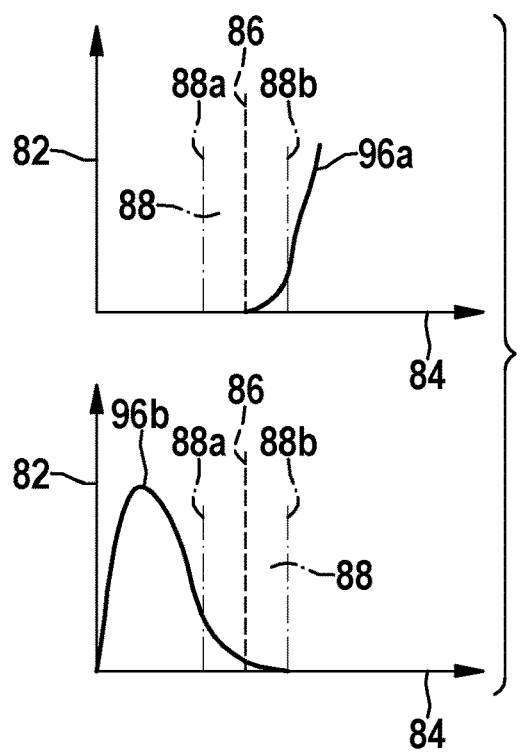
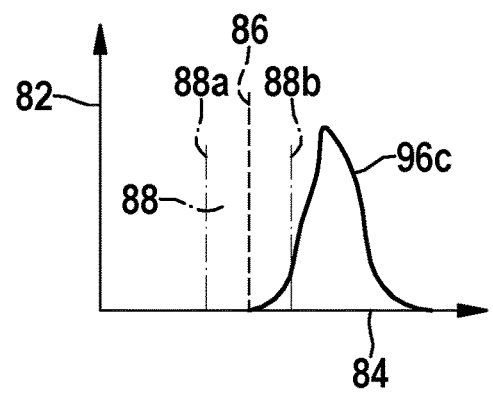
Fig. 2a
Fig. 2b
Fig. 2c

ELECTRONICALLY SLIP-CONTROLLABLE POWER BRAKING SYSTEM

FIELD

The present invention relates to an electronically slip-controllable power braking system.

BACKGROUND INFORMATION

In vehicle manufacturing, electronically slip-controllable braking systems are in the related art and have already been required by law in new vehicles in many countries for some time now.

Braking systems of this type prevent wheels from blocking during braking operations, maintain the vehicle within physical boundaries in a stable driving state and, finally, increase driving safety. In addition, braking systems of this type are autonomously, i.e., without the participation of a driver, capable of building up a brake pressure in hazardous situations and thus preventing accidents. Braking systems of this type are often also referred to as braking systems having an anti-lock system (ABS), a traction control system (TCS) or an electronic stability program (ESP).

Slip-controllable braking systems are increasingly designed as power braking systems. Power braking systems are characterized in that the braking intent of a driver is electronically detected and translated into a brake pressure by a controllably drivable pressure generator. The wheel brakes, to which this brake pressure is applied, ultimately bring about the desired vehicle deceleration.

It is conventional to employ cyclically working piston pumps, continuously conveying gear pumps or plunger devices as the pressure generator in slip-controllable braking systems. The slip-controllable power braking system underlying the present invention according to FIG. 1 includes two brake circuits that are connected in parallel with one another and are jointly supplied by a plunger pressure generator with pressure medium under brake pressure.

Since, under usage conditions of braking systems, it cannot be reliably excluded that mechanical damage or a leakiness resulting in a leak at one of the brake circuits may occur and since in this case, due to the joint pressure generator of the brake circuits, the functionality of the entire braking system would be at risk, a method for checking the braking system for leak tightness is described in German Patent Application No. DE 10 2018 212 016. Based on this method, it is determinable, which of the brake circuits is subject to the damage. This leaking brake circuit may then potentially be decoupled from the other brake circuits, so that the vehicle may be decelerated to a standstill with the aid of the still intact brake circuit and the pressure medium does not get lost through the leak in the defective brake circuit.

Each brake circuit is equipped with an electronically activatable control valve for the purpose of decoupling from the pressure generator. This control valve is also referred to, for example, as a plunger control valve and may be switched from a normally closed blocked position to a passage position. For this purpose, a plunger control valve has a valve cross section that is controlled by a closing member. The pressure forces at the plunger control valve act on this closing member in an opening manner. If the pressure acting on the closing member is higher than a pressure limit establishable via the constructive valve design, the plunger control valve opens as a result and unblocks the valve cross section. Pressure medium may subsequently advance to a potentially present leak and exit the braking system. The functionality of the still intact brake circuit is reduced as a result of a pressure medium leakage; in addition, exiting pressure medium potentially represent environmental pollution. Furthermore, it is no longer possible to maintain the pressure in the intact brake circuit, since the pressure generation unit pushes volume into the defective circuit.

SUMMARY

An example embodiment of the present invention may have the advantage over the related art that this volume exiting a defective brake circuit is reduced to a minimal volume and that the intact brake circuit is consequently available for a prolonged period of time. In addition, undesirable environmental pollution is largely prevented.

Other advantages or advantageous refinements of the present invention result from the disclosure herein.

The present invention is implemented based on a modified electronic control unit for controlling the braking system and thus advantageously does not require a greater installation space or increased expenditures for parts or for the installation of a hydraulic assembly of a braking system of this type.

The present invention is based on, among other things, a device in an electronic control unit of the braking system that is designed to shift the plunger control valve of a brake circuit subjected to leakage into the passage position when the pressure generated by the pressure generator at least approximates or exceeds a pressure limit of the particular plunger control valve.

Remarkably, the pressure medium leakage of a brake circuit experiencing a leakage is reduced with the aid of the present invention in that this brake circuit is coupled to the pressure generator under given preconditions and acted upon by brake pressure. The (de-)coupling of the brake circuit experiencing the leakage takes place by correspondingly electronically activating the plunger control valve that is assigned to the brake circuit experiencing the leakage.

BRIEF DESCRIPTION OF THE DRAWINGS

One exemplary embodiment of the present invention is shown in the figures and explained in detail in the description below.

FIG. 2a shows a section of a brake circuit of this braking system according to FIG. 1 including a first brake circuit branch having a leak and an intact, second brake circuit branch being connected in parallel therewith.

FIG. 2b show diagrams which show the leakage behavior of the individual components in the damaged brake circuit branch.

FIG. 2c shows the sum leakage of the brake circuit.

DETAILED DESCRIPTION OF EXAMPLE EMBODIMENTS

Figure 1:
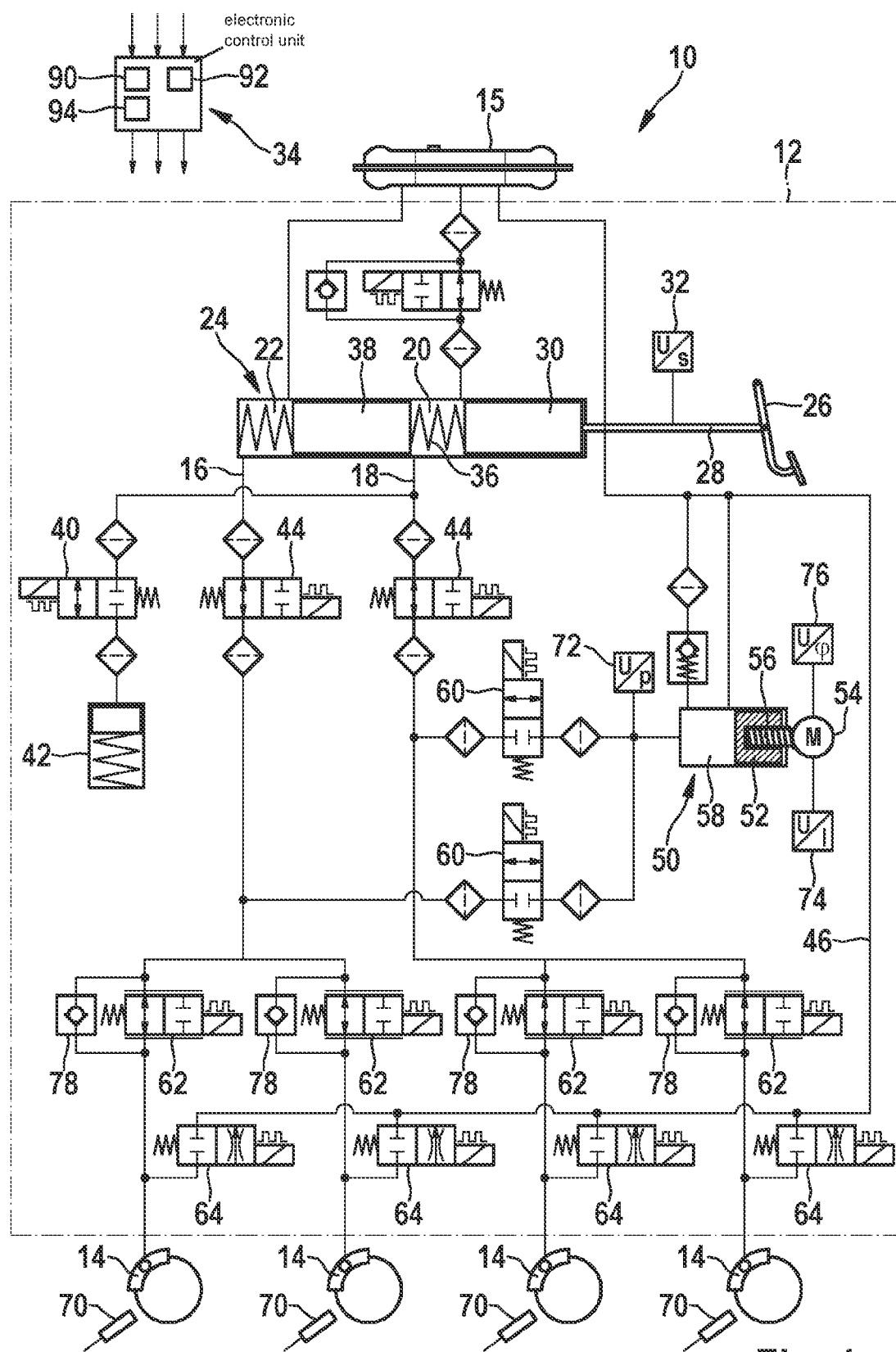
FIG. 1 shows a hydraulic circuit diagram of an electronically slip-controllable power braking system underlying the present invention. This hydraulic circuit diagram is provided together with a method, which is also underlying the following present invention, for checking the braking system for leak tightness in German Patent Application No. DE 10 2018 212 016.

Braking system 10 shown in FIG. 1 is broken down into a hydraulic assembly 12 including wheel brakes 14 connected to it and a pressure medium reservoir 15 also connected to it. Four wheel brakes 14 are present overall, each being supplied in pairs with pressure medium via two existing brake circuits 16 and 18. Each one of the two brake circuits 16; 18 of braking system 10 is connected to each one of a total of two pressure medium chambers 20; 22 of a main brake cylinder 24. The latter is also positioned in hydraulic assembly 12 by way of example. Each of pressure medium chambers 20; 22 is in turn connected with pressure medium reservoir 15. Main brake cylinder 24 is designed with the aid of an actuation device 26 in the form of a pedal by way of example, which is actuatable by the driver. For this purpose, the pedal is connected with a so-called rod piston 30 of main brake cylinder 24 via a coupling rod 28.

By actuating the pedal the driver predefines a braking intent. This braking intent is manifested in an actuation path of coupling rod 28, which is ascertained by a first sensor device 32 detecting the actuation path of coupling rod 28 and supplied to an electronic control unit 34 of braking system 10. A rod piston spring 36, with the aid of which rod piston 30 is supported at a floating piston 38 of main brake cylinder 24, transfers the displacement of rod piston 30 to floating piston 38.

Pressure medium chamber 20 of main brake cylinder 24, which is assigned to rod piston 30, is coupled via a pressure medium connection controllable by a simulator control valve 40 to a simulator device 42, in which the pressure medium displaced from pressure medium chamber 20 of main brake cylinder 24 is buffered in the case of an actuation of the pedal. If simulator control valve 40 is open, an actuation path of the pedal is illustratable with the aid of simulator device 42.

The two pressure medium chambers 20 and 22 of main brake cylinder 24 are each controllably connected with one of brake circuits 16; 18. Electronically activatable circuit separating valves 44 are included for controlling the two pressure medium connections. In the normal operating state of braking system 10 (not illustrated), the connection of pressure medium chambers 20 and 22 with brake circuits 16; 18 is interrupted by circuit separating valves 44 and the pressure medium connection of pressure chamber 20 with simulator device 42 is open.

A brake pressure in brake circuits 16; 18, which is proportional to the braking intent or the required pedal path, is provided in the normal operating state of braking system 10 by a pressure generator 50 as a function of the signal of sensor device 32, among other things. For this purpose, pressure generator 50 is contacted in parallel to main brake cylinder 24 with brake circuits 16; 18. According to FIG. 1, a plunger device, in which a plunger piston 52 is driven to a linear motion by an activatable motor 54 via a downstream transmission 56, is used as pressure generator 50. This pressure generator 50 displaces pressure medium from a plunger work space 58 into the two brake circuits 16; 18. Electronically activatable plunger control valves 60 are provided to control existing connections between brake circuits 16; 18 and pressure generator 50. These plunger control valves 60 are electronically activatable, normally blocking switching valves that control two pressure medium connections in each case.

Downstream from plunger control valves 60 and circuit separating valves 44, braking system 10 includes in each case a so-called pressure modulation device. The latter includes in each case per connected wheel brake 14 an assigned electronically activatable pressure buildup valve 62 and a pressure reduction valve 64 designed in a similar manner. Pressure buildup valves 62 are controllable, normally open control valves for controlling two pressure medium connections in each case that are, through electronic activation, able to be put into a blocked position, while, in contrast, pressure reduction valves 64 are designed as control valves for controlling two pressure medium connections in each case that are switchable through electronic activation from a blocked position to a passage position. Pressure buildup valves 62 and pressure reduction valves 64 make it possible through corresponding electronic activation to adapt the wheel brake pressure prevailing in individual wheel brakes 14 to the slip conditions at the wheel assigned in each case.

Pressure buildup valves 62 are pressure-controlled check valves 78 connected in parallel. These check valves 78 control a bypass that creates a directional circulation around pressure reduction valves 64. If a higher pressure is present at the pressure medium connection of a check valve 78 that faces pressure generator 50 than at the pressure medium connection that faces a wheel brake 14, check valves 78 assume their blocked positions. Check valves 78 make, conversely, a circulation around pressure buildup valve 62 possible if the pressure level at pressure medium connection 14 on the wheel brake side is higher than at the pressure medium connection on the pressure generator side. The object of check valves 78 is to allow for a pressure reduction in wheel brakes 14 as quickly as possible at the end of a braking operation.

The slip at one of the wheels, occurring during the braking operation, is detected by assigned wheel rotation rate sensors 70 based on a decreasing wheel rotation rate. If a wheel is at risk of becoming blocked, a reduction of the brake pressure takes place by opening pressure reduction valve 64 in question and through a thus resulting pressure medium outflow from wheel brake 14 into a return line 46 leading to pressure medium reservoir 15.

To control the brake pressure in wheel brakes 14, braking system 10 is equipped with further sensor devices. One sensor device 72 detects the brake pressure of brake circuits 16; 18; additional sensor devices 74; 76 evaluate the drive of pressure generator 50 or the actuation path of plunger piston 52. The signals of sensor devices 70 through 76 are fed to electronic control unit 34 that uses them to compute a variable activation signal to motor 54 of pressure generator 50 and to elucidated valves 40; 44; 60; 62; 64.

In the case of first branch 16a of first brake circuit 16 shown in FIG. 2a, plunger control valve 60 or the first control valve downstream from pressure generator 50 is in the not actuated initial position and thus blocks the pressure medium connection from pressure generator 50 to wheel brake 14. Pressure buildup valve 62 or the second control valve of this branch 16a placed downstream from this plunger control valve 60 is, in contrast, electronically actuated and thus also assumes its blocked position. The pressure medium connection of pressure generator 50 to wheel brake 14 is thus blocked twice and thus pressure medium cannot flow through. As a result of a leak 80 present between second control valve or pressure buildup valve 62 and wheel brake 14 in this first branch 16a, pressure medium in principle thus does not exit.

In contrast, in illustrated second branch 16b of this brake circuit 16 first control valve or plunger control valve 60 facing pressure generator 50 is electronically activated and assumes its passage position, while second control valve or pressure buildup valve 62 facing wheel brake 14 is in the initial position and thus has pressure medium flowing through it. In second branch 16b no leak is present, so that a brake pressure may be built up in assigned wheel brake 14 by pressure generator 50 through pressure medium displacement into this second branch 16b.

The two diagrams in FIG. 2b are assigned to first branch 16a of first brake circuit 16 having leak 80 and indicate the leakage behavior of the two control valves in their positions illustrated in FIG. 2a. Leakage characteristic lines 96a and 96b show pressure medium leakage 82 at the corresponding control valve against pressure 84 present at the control valve in each case. A vertical line in the diagram illustrates a so-called pressure limit 86. This pressure limit 86 is predefinable by the dimensioning and constructive creation of particular first control valve or plunger control valve 60, in particular of its closing member, of its valve cross section and of its resetting device. Leakage characteristic line 96a of plunger control valve 60 increases at a relatively high gradient as soon as the pressure present at this plunger control valve 60 increases with regard to depicted pressure limit 86. The reason for this valve behavior is that the hydraulic forces acting on the closing member have an opening effect and surpass the counteracting, closing mechanical forces, as soon as this pressure limit 86 is exceeded.

In contrast thereto, second control or pressure buildup valve 62 shows a leakage characteristic line 96b whose course resembles a parabola that is open downward in the diagram below pressure limit 86. This leakage characteristic is due to check valve 78 that is connected in parallel to the second control valve and that blocks if a pressure drop is present and acts from pressure generator 50 in the direction of wheel brake 14. However, a reliable blocking effect of this check valve 78 requires a minimal force acting upon a closing member of check valve 78 in the blocking direction. This minimum force is reached, for example, if a pressure on the level of pressure limit 86 of plunger control valve 60 is present at check valve 78. In the case of a pressure that is lower than this pressure limit 86, the blocking effect of check valve 78 is thus imperfect and pressure medium may consequently circulate around control valve 62 via check valve 78.

Sum leakage 96c in brake circuit 16 resulting from the two leakage characteristic lines 96a and 96b according to FIG. 2b is shown in the diagram according to FIG. 2c. If the pressure in brake circuit 16 is below pressure limit 86 no leakage occurs, since plunger control valve 60 reliably blocks in this pressure range, as illustrated. Above pressure limit 86, however, plunger control valve 60 has pressure medium flowing over it for the reasons explained and allows pressure medium to pass. As a result of the initially small open control cross section and the thus high throttling effect of plunger control valve 60, the pressure acting in the closing direction on check valve 78 is low to such an extent that its blocking effect is not enough to reliably block the pressure medium connection to wheel brake 14. Second control or pressure buildup valve 62 consequently has pressure medium flowing around it. As a result, pressure medium may still reach leak 80 in the case of pressures above pressure limit 86 and exit braking system 10. According to FIG. 2c, this pressure medium leakage assumes its maximum volume if the pressure in brake circuit 16 is beyond pressure limit 86. If a circuit pressure further increases past that, this pressure medium leakage goes back to zero, since the forces acting in a closing manner on check valve 78 are great enough to ensure its blocking effect.

Figure 3A:
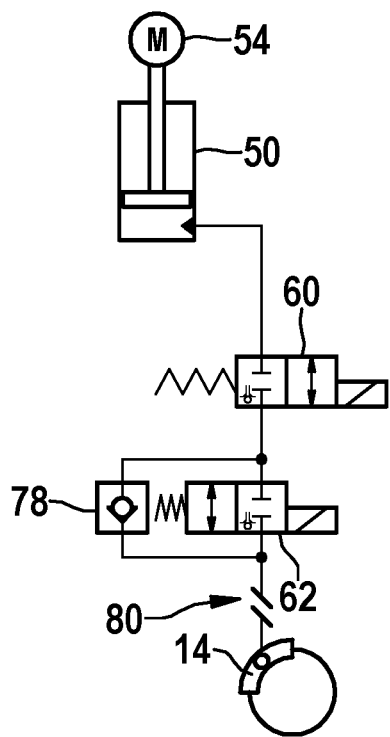
FIGS. 3a and 3b illustrate an example embodiment of the present invention based on a representation of the first brake circuit branch experiencing the leakage and having its two control valves connected in series. The latter assume different valve positions in FIGS. 3a and 3b.
Figure 3B:
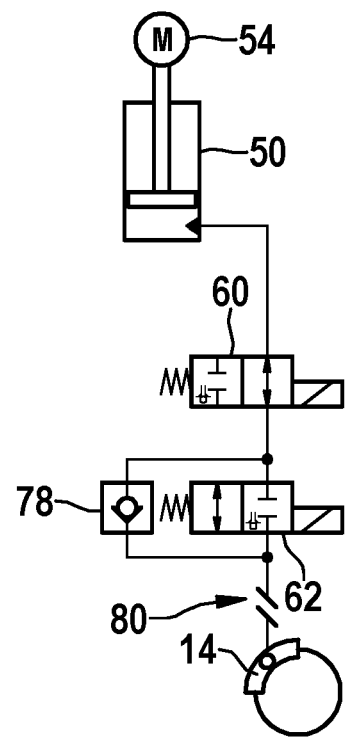

These conditions change if the defective brake circuit 16 having leak 80 is controlled in such a way that its two control valves connected in series with one another assume the valve positions shown in FIGS. 3a and 3b. The positions according to FIG. 3a are assumed by the control valves during a pressure buildup phase by pressure generator 50, if the pressure in defective brake circuit 16; 18 is between 0 and a lower range limit of a hysteresis range 88 around pressure limit 86 of plunger control valve 60 facing pressure generator 50 or if the pressure in brake circuit 16 is between 0 and an upper range limit of hysteresis range 88 around pressure limit 86 of plunger control valve 60 during a pressure reduction phase by pressure generator 50.

In contrast thereto, FIG. 3b shows the positions of the control valves during a pressure buildup phase by pressure generator 50, if the pressure in brake circuit 16 is between the lower range limit of hysteresis range 88 around pressure limit 86 of plunger control valve 60 and a maximum pressure illustratable by pressure generator 50 or during a pressure reduction phase by pressure generator 50, if the brake pressure in brake circuit 16 is between an upper range limit of hysteresis range 88 around pressure limit 86 of plunger control valve 60 and the maximal pressure suppliable by pressure generator 50.

According to FIG. 3a, the control valves are initially activated as explained in the context with the description of FIG. 2. These valve positions are kept until the pressure in brake circuit 16 approaches a lower range limit 88a of a hysteresis range 88 around pressure limit 86. In this range, first control or plunger control valve 60 reliably seals brake circuit 16 from wheel brake 14. If the pressure of pressure generator 50 reaches or exceeds lower range limit 88a of hysteresis range 88 around pressure limit 86 of plunger control valve 60, plunger control valve 60 is activated by electronic control unit 34 and put in its passage position (FIG. 3b) according to the present invention.

Due to now open plunger control valve 60, its throttling effect is reduced, so that the pressure of pressure generator 50 acts in a nearly unreduced manner on check valve 78 connected in parallel to pressure buildup valve 62 and the effective pressure thus ensures its blocking effect.

In the case of a pressure buildup taking place by pressure generator 50, plunger control valve 60 is electronically activated according to FIG. 3b and thus kept in its passage position until the pressure of pressure generator 50 has reached an upper range limit 88b of hysteresis range 88 around pressure limit 86 of plunger control valve 60. Now, the activation of this plunger control valve 60 is withdrawn, so that same returns to the blocked position shown in FIG. 3a.

A hysteresis range 88 including the lower and upper range limits 88a and 88b around pressure limit 86 of first control or plunger control valve 60 is advantageously to be provided to prevent that in the case of pressure values close to established pressure limit 86 of plunger control valve 60, plunger control valve 60 switches at a high frequency as a result of changing electronic activation back and forth between its blocked position and its passage position and thus causes a disruptively perceivable noise in an undesirable manner or is subject to thermal or mechanical overload.

Figure 4A:
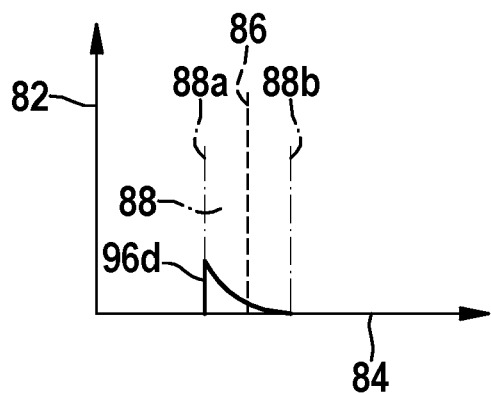
FIGS. 4a and 4b are assigned to FIGS. 3a and 3b and illustrate the sum leakage of the brake circuit during the pressure buildup or the pressure reduction phase by the pressure generator.
Figure 4B:
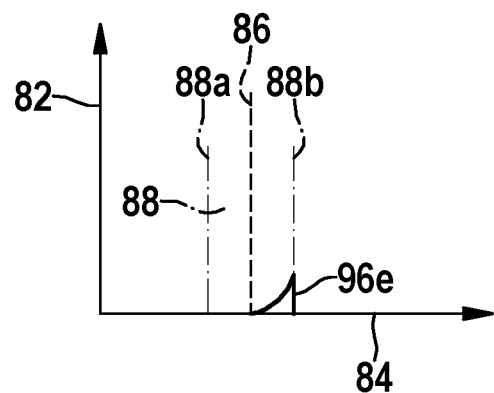

FIG. 4a shows in the context of the above-described embodiments leakage characteristic line 96d of brake circuit 16; 18 during a pressure buildup by pressure generator 50 and FIG. 4b represents leakage characteristic line 96e of this brake circuit 16; 18 during a pressure reduction by pressure generator 50.

According to FIG. 4a, there is no pressure medium leakage in a damaged brake circuit 16; 18 in the case of a pressure buildup in brake circuit 16; 18 until upper range limit 88a of hysteresis range 88 around pressure limit 86 of plunger control valve 60 is reached. The pressure medium leakage then increases abruptly to a low maximum value if the pressure in brake circuit 16; 18 has reached lower range limit 88a of hysteresis range 88 around pressure limit 86 of plunger control valve 60 and subsequently, i.e., with the pressure in brake circuit 16; 18 further increasing, steadily returns to 0.

In contrast thereto, a minor pressure medium leakage occurs in the case of a pressure reduction by pressure generator 50 only if the pressure in brake circuit 16; 18 is between pressure limit 86 of plunger control valve 60 and upper range limit 88b of hysteresis range 88 around this pressure limit 86. The maximal pressure medium leakage is reached when the pressure in brake circuit 16; 18 corresponds to the pressure of upper range limit 88b. The pressure medium leakage then steadily returns to 0 with decreasing pressure in brake circuit 16; 18, as shown.

The elucidated activation of plunger control valve 60 takes place with the aid of electronic control unit 34 of braking system 10, if necessary. For this purpose, this electronic control unit 34 is equipped with a first device 90 (FIG. 1) that checks brake circuits 16; 18 for leak tightness and thus establishes a potentially occurring leakage in one of brake circuits 16; 18. Brake circuit 16; 18 having a leakiness is decoupled by first device 90 from pressure generator 50 in that plunger control valve 60 assigned to this brake circuit 16; 18 is activated in such a way that it assumes its blocked position. Here, reference is made again to German Patent Application No. DE 10 2018 212 016 with regard to further functionality of this first device 90.

Moreover, electronic control unit 34 is equipped with a second device 92 (FIG. 1) that is designed to compare a level of the pressure generated by pressure generator 50 with the electronically stored pressures. For this purpose, this device 92 evaluates the signals provided by pressure sensor 72 present in braking system 10 and compares these signals with the signals that are stored in control unit 34 and represent pressure limit 86 of first control or plunger control valve 60. The object here is to establish whether the pressure of pressure generator 50 exceeds predetermined pressure limit 86 of plunger control valve 60. Furthermore, lower and upper range limit 88a; 88b of elucidated hysteresis range 88 around this pressure limit 86 of first control or plunger control valve 60 may be stored in this second device 92 of electronic control unit 34 by way of example.

A further third device 94 (FIG. 1) present in electronic control unit 34 is designed to put first control or plunger control valve 60, which is closest to pressure generator 50, at least indirectly into its passage position if a leakage in a brake circuit 16; 18 is established by first device 90 of electronic control unit 34 and the pressure generated by pressure generator 50 has at least approximately reached or exceeded pressure limit 86 of plunger control valve 60.

As a result, the pressure medium leakage of a damaged brake circuit 16; 18 occurring through elucidated devices 90 through 94 of electronic control unit 34 is significantly reduced as compared to the related art.

Further modifications or additions to the described exemplary embodiment are naturally possible without departing from the basic idea of the present invention.

What is claimed is:

1. An electronically slip-controllable power braking system for a motor vehicle, comprising:
   a controllably driven pressure generator;
   multiple brake circuits connected in parallel to one another to the pressure generator, each respective brake circuit of the brake circuits respectively having an electronically controllable first control valve for separating the respective brake circuit from the pressure generator, and an electronically controllable second control valve situated downstream from first control valve for controlling a brake pressure in a wheel brake coupled to the respective brake circuit; and
   an electronic control unit configured to activate the pressure generator and the first and second control valves, wherein the electronic control unit is equipped with a first device configured to check the brake circuits for leak tightness and to initiate decoupling at least indirectly from the pressure generator when a leakiness is established, a second device configured to compare signal variables representing pressures to one another, and a third device configured to put the first control valve of a brake circuit of the brake circuit into a passage position if a leakiness of the brake circuit is established and a pressure built up by the pressure generator has at least approximately reached or exceeded a pressure limit of the first control valve of the brake circuit.

2. The electronically slip-controllable power braking system as recited in claim 1, wherein the first control valve is able to be put from a normally closed initial position into a position in which pressure medium is able to flow through the first control valve by applying pressure medium under an actuating pressure that is higher than an establishable pressure limit of this first control valve or by electronic activation by the electronic control unit.

3. The electronically slip-controllable power braking system as recited in claim 1, wherein a pressure actuated check valve, which assumes a blocked position in the direction from the pressure generator to the wheel brake and is permeable for pressure medium in the direction from the wheel brake to the pressure generator, is connected in parallel with each of the second control valves.

4. The electronically slip-controllable power braking system as recited in claim 1, wherein in the electronic control unit, a hysteresis range around the pressure limit of the first control valves is stored and the third device of the electronic control unit is configured to put the first control valve of the brake circuit having a leakiness at least indirectly into the passage position, when a lower range limit of the hysteresis range around the pressure limit of the first control valve has been reached or exceeded during a pressure buildup that takes place by the pressure generator.

5. The electronically slip-controllable power braking system as recited in claim 4, wherein the third device of the electronic control unit is configured to put the first control valve of the brake circuit having a leakiness at least indirectly into the blocked position, when an upper range limit of the hysteresis range around the pressure limit of the first control valve has been reached or undershot during a pressure reduction by the pressure generator.

* * * * *